United States Patent
Lee (10) Patent No.: US 9,698,949 B2
(45) Date of Patent: Jul. 4, 2017

(54) METHOD OF HANDLING DEVICE-TO-DEVICE SIGNAL AND DEVICE-TO-CELLULAR SIGNAL AND RELATED COMMUNICATION DEVICE

(71) Applicant: ACER INCORPORATED, New Taipei (TW)

(72) Inventor: Chien-Min Lee, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 75 days.

(21) Appl. No.: 14/590,009

(22) Filed: Jan. 6, 2015

(65) Prior Publication Data

US 2015/0200756 A1    Jul. 16, 2015

Related U.S. Application Data

(60) Provisional application No. 61/925,659, filed on Jan. 10, 2014.

(51) Int. Cl.

| H04W 80/00 | (2009.01) |
|---|---|
| H04L 5/00 | (2006.01) |
| H04W 24/06 | (2009.01) |
| H04W 76/02 | (2009.01) |
| H04W 52/34 | (2009.01) |
| H04W 52/38 | (2009.01) |
| H04W 28/04 | (2009.01) |
| H04W 88/06 | (2009.01) |

(Continued)

(52) U.S. Cl.
CPC .......... *H04L 5/0048* (2013.01); *H04L 5/0032* (2013.01); *H04L 5/0082* (2013.01); *H04W 24/06* (2013.01); *H04W 52/346* (2013.01); *H04W 52/383* (2013.01); *H04W 76/023* (2013.01); *H04W 76/025* (2013.01); *H04L 5/001* (2013.01); *H04L 5/14* (2013.01); *H04W 28/04* (2013.01); *H04W 52/146* (2013.01);

(Continued)

(58) Field of Classification Search
None
See application file for complete search history.

(56) References Cited

U.S. PATENT DOCUMENTS

2011/0306349 A1* 12/2011 Hakola ................. H04W 28/04
455/450
2013/0170387 A1* 7/2013 Wang .................... H04W 4/005
370/252

(Continued)

FOREIGN PATENT DOCUMENTS

EP    2 836 039 A1    2/2015
KR    1020130122572 A    11/2013

(Continued)

OTHER PUBLICATIONS

Catt, Multiplexing between cellular link and D2D link, 3GPP TSG RAN WG1 Meeting #75, Nov. 11-15, 2013, R1-135093, San Francisco, USA, XP050750593.

*Primary Examiner* — Omar Ghowrwal
*Assistant Examiner* — Angel Brockman
(74) *Attorney, Agent, or Firm* — Winston Hsu (57) ABSTRACT

A method of handling a device-to-device (D2D) signal and a device-to-cellular (D2C) signal for a first communication device comprises communicating with a second communication device according to a D2D communication; communicating with a network according to a D2C communication; and transmitting one of the D2D signal and the D2C signal in a subframe, wherein the D2D signal and the D2C signal are transmitted to the second communication device and the network, respectively.

29 Claims, 6 Drawing Sheets

(51) Int. Cl.
*H04W 72/04* (2009.01)
*H04W 52/14* (2009.01)
*H04L 5/14* (2006.01)

(52) U.S. Cl.
CPC ........ *H04W 72/0446* (2013.01); *H04W 88/06* (2013.01)

(56) References Cited

U.S. PATENT DOCUMENTS

| | | |
|---|---|---|
| 2013/0230032 A1 | 9/2013 | Lu |
| 2014/0003262 A1* | 1/2014 | He ...................... H04W 28/08 370/252 |
| 2014/0016574 A1 | 1/2014 | Seo |
| 2014/0094162 A1* | 4/2014 | Heo ...................... H04L 5/0055 455/422.1 |
| 2014/0112263 A1* | 4/2014 | Lee ...................... H04L 5/0096 370/329 |
| 2014/0185495 A1* | 7/2014 | Kuchibhotla ....... H04W 76/023 370/281 |
| 2015/0092689 A1 | 4/2015 | Ko |
| 2015/0124737 A1 | 5/2015 | Lee |

FOREIGN PATENT DOCUMENTS

| | | |
|---|---|---|
| WO | 2013163859 A1 | 11/2013 |
| WO | 2013165145 A1 | 11/2013 |
| WO | 2014007581 A1 | 1/2014 |

\* cited by examiner

METHOD OF HANDLING DEVICE-TO-DEVICE SIGNAL AND DEVICE-TO-CELLULAR SIGNAL AND RELATED COMMUNICATION DEVICE

CROSS REFERENCE TO RELATED APPLICATIONS

This application claims the benefit of U.S. Provisional Application No. 61/925,659, filed on Jan. 10, 2014 and incorporated herein by reference.

BACKGROUND OF THE INVENTION

1. Field of the Invention

The present invention relates to a method used in a wireless communication system and related communication device, and more particularly, to a method of handling a device-to-device signal and a device-to-cellular signal and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

Device-to-device (D2D) communication may be realized, after an initialization (e.g., connection establishment and/or peer discovery) is performed (e.g., assisted by an eNB). Then, two UEs may communicate (e.g., transmitting and/or receiving packets) with each other directly according to the D2D communication, and the eNB does not need to forward the packets transmitted between the communication devices. According to the D2D communication, the UEs may communicate with each other via UL resources (e.g., UL subframes configured by the eNB). In general, the D2D communication may also be seen as a D2D service (i.e., proximity service (ProSe)). In addition, a D2D subframe, D2D transmission, D2D communication and D2D discovery can be termed as a sidelink subframe, sidelink transmission, sidelink communication and sidelink discovery, respectively.

A UE may transmit a D2D signal and a device-to-cellular (D2C) signal at the same time (e.g., in the same subframe), when the UE supports both D2D communication and D2C communication. However, the D2D communication and the D2C communication may be performed according to different timings. For example, the D2D communication may be performed according to a DL timing, while the D2C communication may be performed according to a UL timing. It should be noted that the DL timing is used for receiving DL signals transmitted by the eNB, and the UE performs alignment of the DL timing by itself. The UL timing is used for transmitting UL signals to the eNB, and the UE performs alignment of the UL timing according to an indication (e.g., timing advance command) transmitted by the eNB. In this situation, a subframe (i.e., D2D subframe) for the D2D communication may overlap with a subframe (i.e., D2C subframe) for the D2C communication. More specifically, the last few single-carrier frequency-division multiple access (SC-FDMA) symbols of the D2D signal may overlap with the first few SC-FDMA symbols of the D2C signal. In such a situation, the D2D signal and the D2C signal may not be transmitted and received correctly, and the D2D communication and the D2C communication may not be performed regularly. The problem may be even severe when the D2C signal includes a sounding reference signal (SRS).

In another example, a total power level (e.g., total transmit power level) used by a UE may be greater than a power level limit of the UE, when the UE transmits a D2D signal and a D2C signal at the same time (e.g., in the same subframe). Accordingly, the UE may transmit the signals incompletely, i.e., with insufficient power levels, and the receptions of the signals may be affected.

Thus, how to multiplex (e.g., transmit) the D2D signal and the D2C signal is an important problem to be solved.

SUMMARY OF THE INVENTION

The present invention therefore provides a method and related communication device for handling a D2D signal and a D2C signal to solve the abovementioned problem.

A method of handling a device-to-device (D2D) signal and a device-to-cellular (D2C) signal for a first communication device comprises communicating with a second communication device according to a D2D communication; communicating with a network according to a D2C communication; and transmitting one of the D2D signal and the D2C signal in a subframe, wherein the D2D signal and the D2C signal are transmitted to the second communication device and the network, respectively.

A method of handling a device-to-device (D2D) signal and a device-to-cellular (D2C) signal for a first communication device comprises transmitting the D2D signal in a subframe to a second communication device; transmitting the D2C signal in the subframe to a network, when the D2C signal comprises a communication device-specific sounding reference signal (SRS); and reserving resource in the subframe, when the D2C signal comprises a cell-specific SRS.

A method of handling a device-to-cellular (D2C) signal and a device-to-device (D2D) signal for a first communication device comprises transmitting the D2C signal with a first power level in a subframe to a network; and transmitting the D2D signal with a second power level in the subframe to a second communication device, wherein the second power level is adjusted according to the first power level and a power level limit of the first communication device.

A method of handling a device-to-cellular (D2C) signal and a device-to-device (D2D) signal for a first communication device comprises transmitting the D2D signal with a first power level in a subframe to a second communication device; and transmitting the D2C signal with a second power level in the subframe to a network, wherein the second power level is adjusted according to the first power level and a power level limit of the first communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
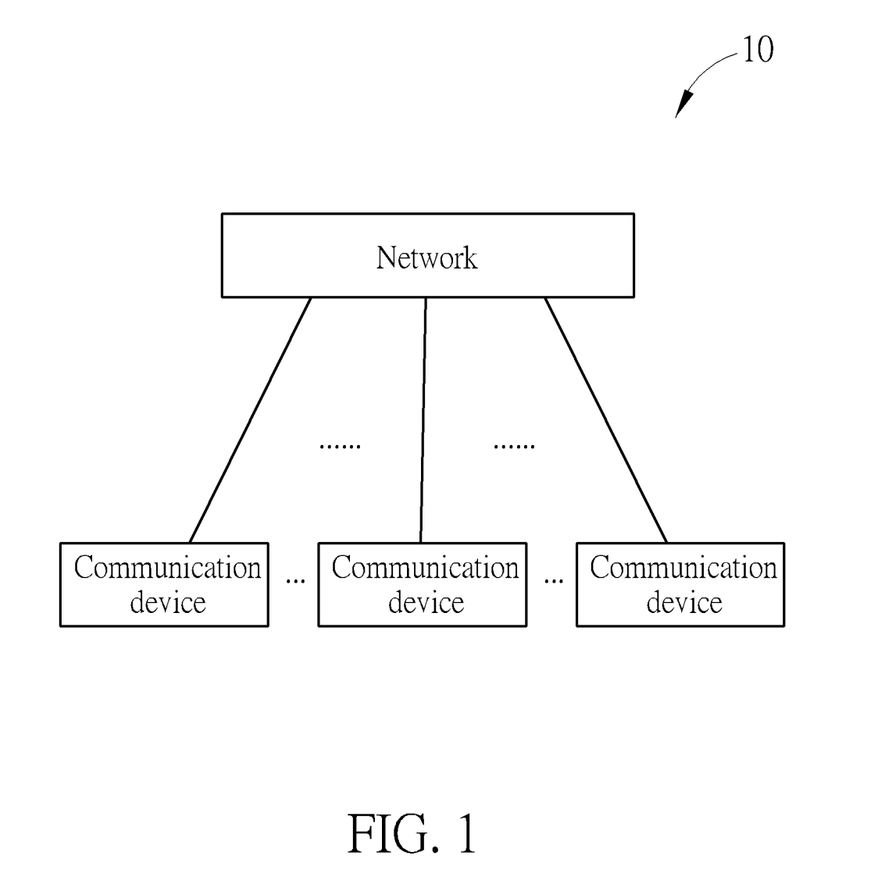
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. A communication device may communicate with the network according to a device-to-cellular (D2C) communication defined in a communication standard, e.g., the 3rd Generation Partnership Project (3GPP). Practically, the network can be a universal terrestrial radio access network (UTRAN) comprising a plurality of Node-Bs (NBs) in a universal mobile telecommunications system (UMTS). In another example, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network.

A communication device can be a user equipment (UE), a low cost device (e.g., machine type communication (MTC) device), a device-to-device (D2D) device, a mobile phone, a laptop, a tablet computer, an electronic book, a portable computer system, or combination thereof. In addition, for the D2C communication, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

In addition, two communication devices may communicate with each other directly, after an initialization (e.g., connection establishment and/or peer discovery) is performed. For example, the initialization may be assisted by the network. That is, the communication devices may communicate (e.g., transmit and/or receive packets) with each other according to a D2D communication defined in a communication standard, e.g., 3GPP standard. The communication devices may communicate with each other via UL subframes determined according to frequency-division duplexing (FDD) configurations and/or time-division duplexing (TDD) configurations. The communication device may communicate with another communication device and the network simultaneously, i.e., both the D2D communication and the D2C communication are realized at the same time.

Figure 2:
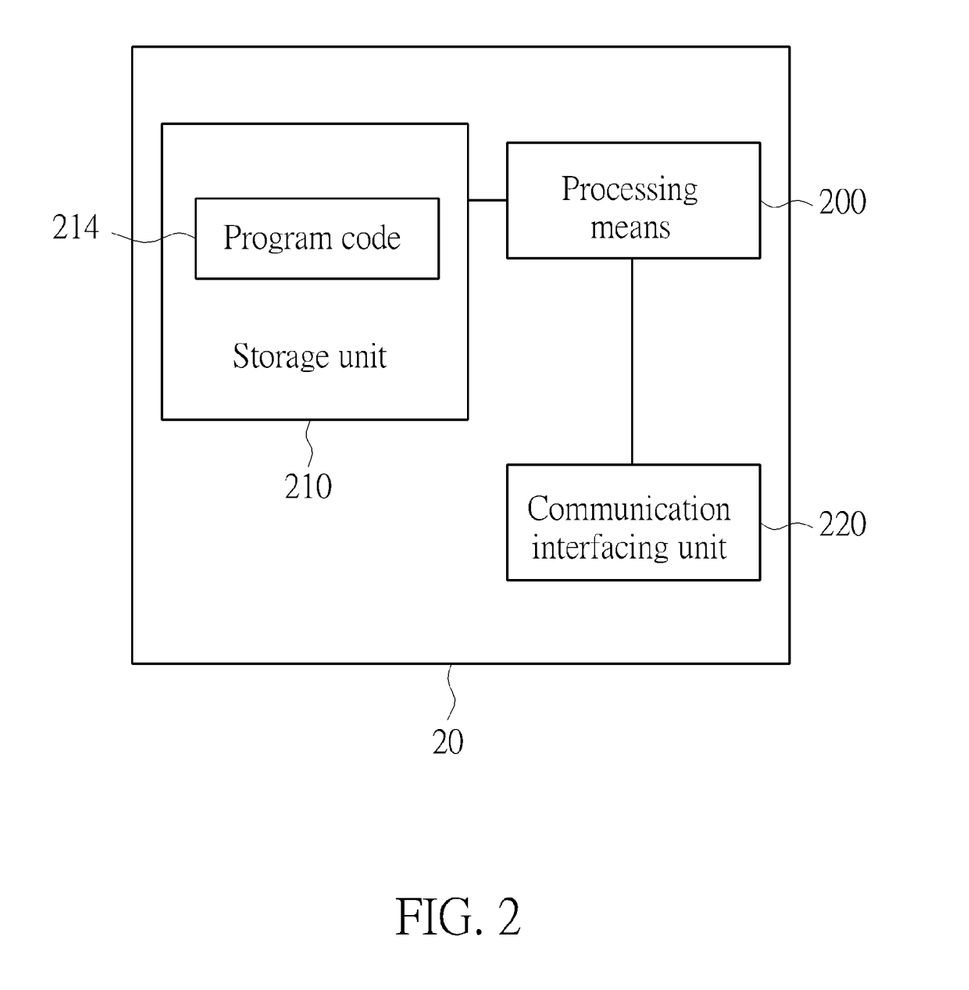
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
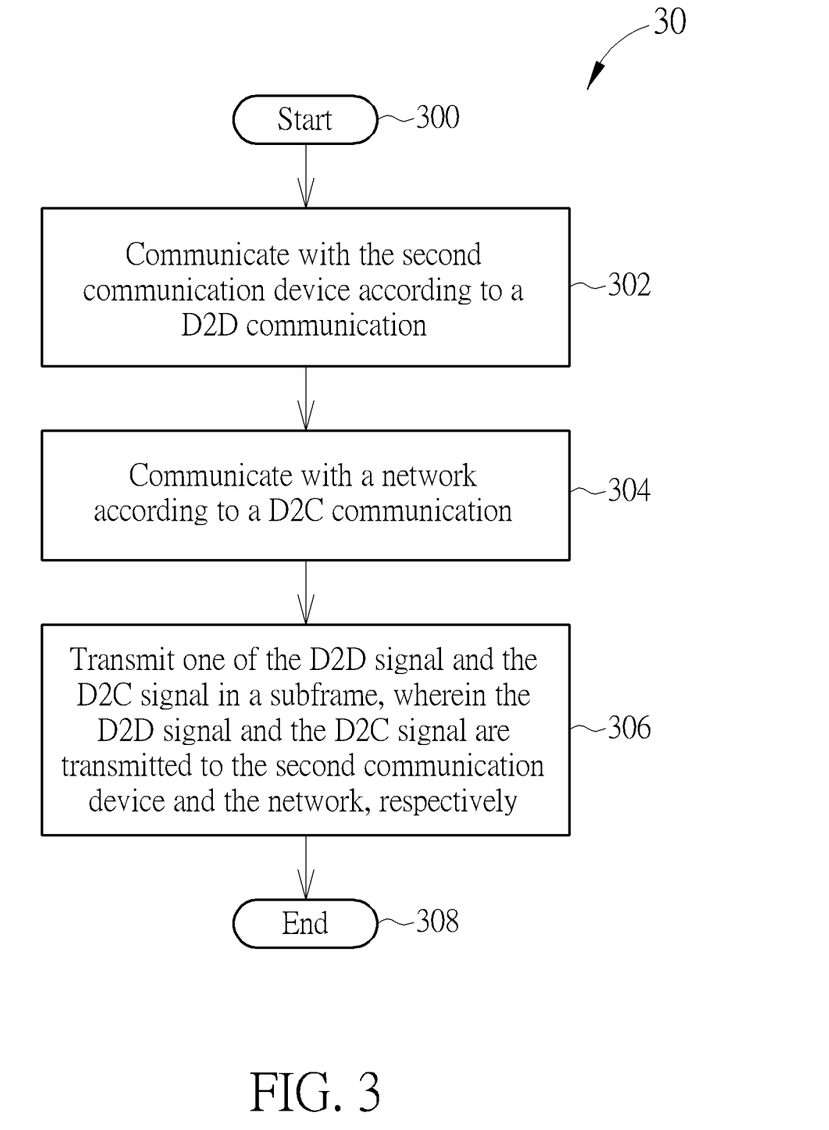
FIG. 3 is a flowchart of a process according to an example of the present invention.

FIG. 3 is a flowchart of a process 30 according to an example of the present invention. The process 30 may be utilized in a first communication device for handling (e.g., multiplexing) a D2D signal and a D2C signal, to communicate with a second communication device and the network. The process 30 may be compiled into the program code 214 and includes the following steps:

Step 300: Start.

Step 302: Communicate with the second communication device according to a D2D communication.

Step 304: Communicate with a network according to a D2C communication.

Step 306: Transmit one of the D2D signal and the D2C signal in a subframe, wherein the D2D signal and the D2C signal are transmitted to the second communication device and the network, respectively.

Step 308: End.

According to the process 30, the first communication device communicates with the second communication device according to a D2D communication, and communicates with a network according to a D2C communication. The first communication device transmits (e.g., only) one of the D2D signal (for D2D communication) and the D2C signal (for D2C communication) in a subframe, wherein the D2D signal and the D2C signal are transmitted to the second communication device and the network, respectively. In other words, the first communication device does not transmit the D2D signal and the D2C signal in the same subframe, when communicating with the second communication device and the network. For example, the D2C signal may be transmitted, while the D2D signal is not (e.g., is dropped). In another example, the D2D signal may be transmitted, while the D2C signal is not (e.g., is dropped). It should be noted that the D2D communication may be a one-way communication, i.e., the first communication device transmits the D2D signal without waiting for a response. In another example, the D2D communication may be a two-way communication, i.e., the first communication device waits for a response for responding the D2D signal from the second communication device. In addition, the D2D signal in the process 30 may not include a guard period (GP). That is, a GP (e.g., with a length of a single-carrier frequency-division multiple access (SC-FDMA) symbol) may be appended in the subframe after a D2D signal to protect the D2D signal. Thus, the transmissions of the D2D signal and the D2C signal do not interfere (e.g., overlap) with each other according to the process 30. The process 30 is especially effective when the D2D communication and the D2C communication follow DL timing and UL timing, respectively. As a result, the receptions of the signals will not be affected. Collision of the D2D signal and the D2C signal can be avoided.

Realization of the present invention is not limited to the above description.

For example, the subframe in the process 30 may be a D2D subframe. The D2C signal may include (or simply be) a sounding reference signal (SRS), and a type of the SRS is not limited herein. For example, the SRS may be a cell-specific SRS, or may be a communication device-specific SRS (i.e., UE-specific SRS). Further, the UE-specific SRS may be a periodic (i.e., Type-0) SRS, or may be an aperiodic (i.e., Type-1) SRS. It means that the D2D subframe may not be considered as a SRS subframe (e.g., cell-specific SRS subframe or UE-specific SRS subframe) according to the process 30.

The first communication device may be in a coverage area of a first cell, and the second communication device may be in a coverage area of a second cell. In one example, the first cell and the second cell may be the same cell. In another example, the first cell and the second cell may be different cells. The D2D signal may be transmitted in the subframe of a first carrier, and the D2C signal may be transmitted in the subframe of a second carrier. In one example, the first carrier and the second carrier may be the same carrier. In another example, the first carrier and the second carrier may be different carriers. The first communication device may support carrier aggregation (CA), if the first carrier and the second carrier are different carriers.

Figure 4:
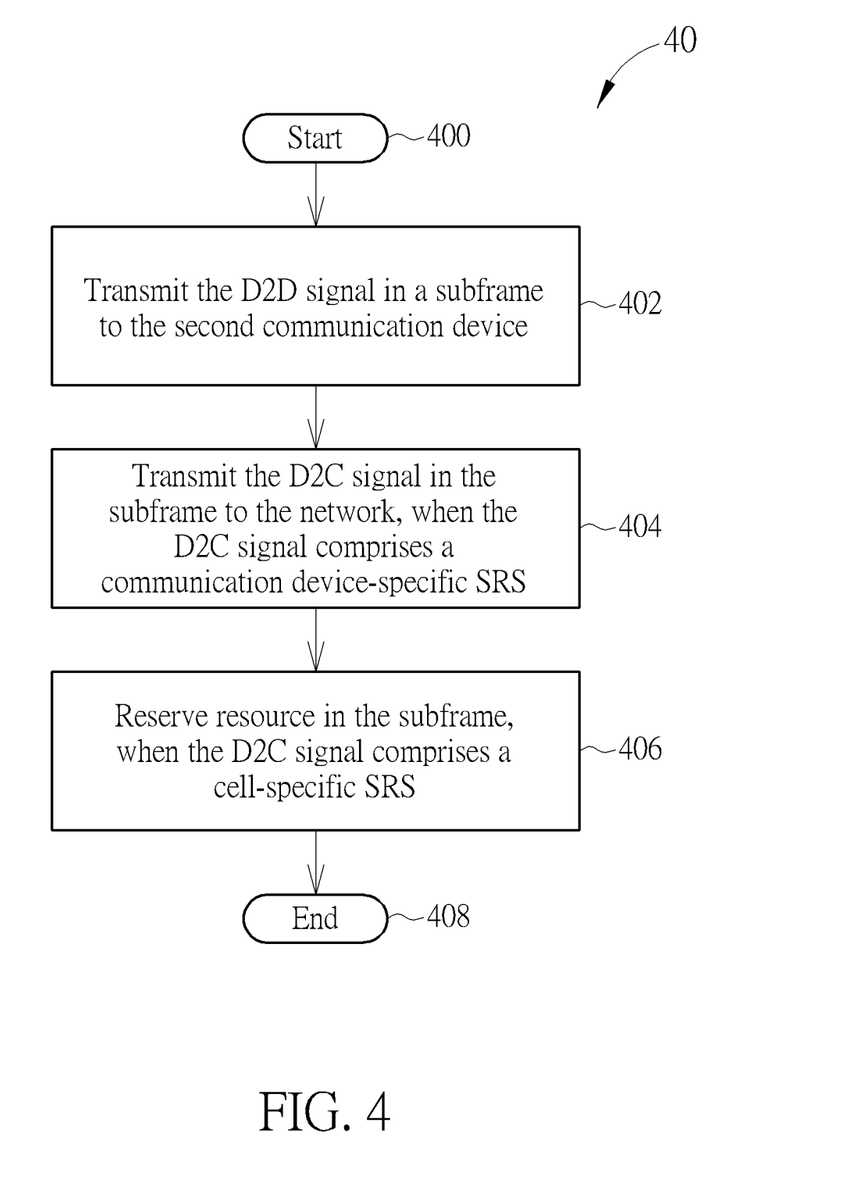
FIG. 4 is a flowchart of a process according to an example of the present invention.

FIG. 4 is a flowchart of a process 40 according to an example of the present invention. The process 40 may be utilized in a first communication device for handling (e.g., multiplexing) a D2D signal and a D2C signal, to communicate with a second communication device and the network. The process 40 may be compiled into the program code 214 and includes the following steps:

Step 400: Start.

Step 402: Transmit the D2D signal in a subframe to the second communication device.

Step 404: Transmit the D2C signal in the subframe to the network, when the D2C signal comprises a communication device-specific SRS.

Step 406: Reserve resource in the subframe, when the D2C signal comprises a cell-specific SRS.

Step 408: End.

According to the process 40, the first communication device transmits the D2D signal in a subframe to the second communication device. Then, the first communication device transmits the D2C signal in the subframe to the network when the D2C signal comprises (or simply is) a communication device-specific SRS (i.e., UE-specific SRS), and reserves resource (e.g., for the D2C signal) in the subframe when the D2C signal comprises (or simply is) a cell-specific SRS. In other words, in one example, the first communication device may transmit the D2D signal and the D2C signal in the same subframe (step 404). In another example, the first communication device may reserve the resource (e.g., for the D2C signal) in the subframe, even if the first communication device does not transmit the D2C signal in the subframe (step 406). In one example, the D2C signal may be transmitted in a reserved resource (e.g., time resource and/or frequency resource) of the subframe. In addition, the D2D signal in the process 40 may not include a GP. That is, a GP may be appended in the subframe after a D2D signal to protect the D2D signal. The transmissions of the D2D signal and the D2C signal do not interfere (e.g., overlap) with each other according to the process 40, e.g., when a proper arrangement is made to the transmissions. The process 40 is especially effective when the D2D communication and the D2C communication follow DL timing and UL timing, respectively. As a result, the receptions of the signals will not be affected. Collision of the D2D signal and the D2C signal can be avoided.

Realization of the present invention is not limited to the above description.

For example, the subframe in the process 40 may be a D2D subframe. That is, the D2C signal may be transmitted in the D2D subframe. The D2C signal may include (or simply be) a sounding reference signal (SRS), and a type of the SRS is not limited herein. For example, the SRS may be a cell-specific SRS, or may be a communication device-specific SRS (i.e., UE-specific SRS). Further, the UE-specific SRS may be a periodic (i.e., Type-0) SRS, or may be an aperiodic (i.e., Type-1) SRS. It means that the D2D subframe may also be a SRS subframe (e.g., cell-specific SRS subframe or UE-specific SRS subframe).

The first communication device may be in a coverage area of a first cell, and the second communication device may be in a coverage area of a second cell. In one example, the first cell and the second cell may be the same cell. In another example, the first cell and the second cell may be different cells. In one example, a SRS configuration of the first cell and a SRS configuration of the second cell may be the same. That is, a subframe may be a cell-specific SRS subframe for a group of cells. In other words, configurations of the cell-specific SRS of the cells are aligned. In one example, the D2D signal (e.g., the number of available SC-FDMA symbols in a D2D subframe) is transmitted according to a configuration (e.g., bitmap) transmitted by the network. That is, whether a subframe can be used for transmitting a cell-specific SRS is indicated in the configuration.

The resource in the process 40 may include a last SC-FDMA symbol of the D2D signal. That is, the last SC- FDMA symbol of the D2D signal is not used for transmitting D2D information, but may be reserved for D2C information. A condition according to which the resource is reserved is not limited. For example, the resource is reserved according to a configuration (e.g., dynamic configuration) transmitted by the network. In one example, the configuration is included in a higher layer signaling (e.g., radio resource control (RRC) signaling) transmitted by a serving cell of the network. In another example, the resource is reserved according to a predetermined pattern. In another example, the resource is reserved, when resources (e.g., bandwidth) for transmitting the D2D signal and the D2C signal (e.g., cell-specific SRS) partly overlap.

The D2D signal may be transmitted in the subframe of a first carrier, and the D2C signal may be transmitted in the subframe of a second carrier. In one example, the first carrier and the second carrier may be the same carrier. In another example, the first carrier and the second carrier may be different carriers. The first communication device may support CA, if the first carrier and the second carrier are different carriers.

In one example, a D2D signal may be transmitted according to a configuration (e.g., bitmap) transmitted by the network, when the first communication device and the second communication device are in coverage areas of a first cell and a second cell, respectively. In this situation, resource which is originally scheduled for transmitting a D2D signal may be reserved (e.g., for a D2C signal such as a SRS signal) according to a configuration transmitted by the network or according to a predetermined pattern.

Figure 5:
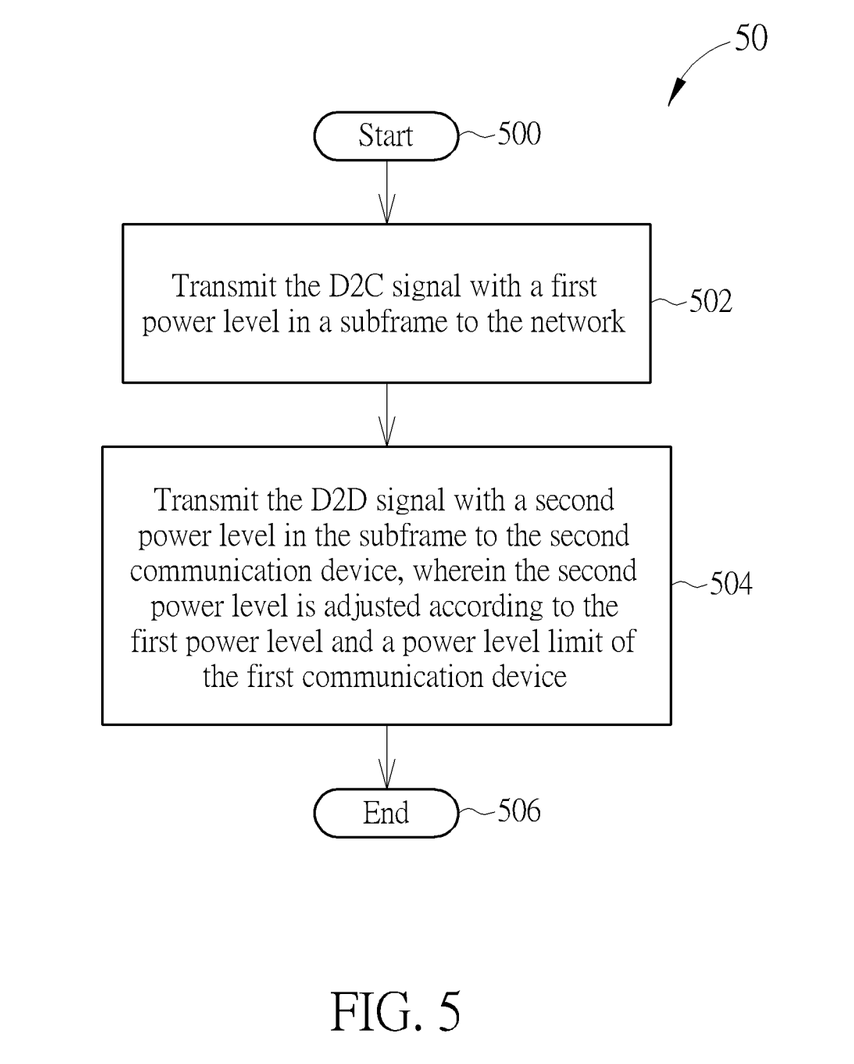
FIG. 5 is a flowchart of a process according to an example of the present invention.

FIG. 5 is a flowchart of a process 50 according to an example of the present invention. The process 50 may be utilized in a first communication device for handling (e.g., multiplexing) a D2D signal and a D2C signal, to communicate with a second communication device and the network. The process 50 may be compiled into the program code 214 and includes the following steps:

Step 500: Start.

Step 502: Transmit the D2C signal with a first power level in a subframe to the network.

Step 504: Transmit the D2D signal with a second power level in the subframe to the second communication device, wherein the second power level is adjusted according to the first power level and a power level limit of the first communication device.

Step 506: End.

According to the process 50, the first communication device transmits the D2C signal with a first power level in a subframe to the network, and transmits the D2D signal with a second power level in the subframe to the second communication device, wherein the second power level is adjusted according to the first power level and a power level limit of the first communication device (e.g., maximum transmit power level). That is, the first communication device may adjust (e.g., reduce) the second power level for transmitting the D2D signal, such that the total transmit power level used in the subframe is not greater than the power level limit (e.g., defined in a communication standard). In other words, a priority of the D2C signal may be higher than a priority of the D2D signal. Accordingly, the power level for transmitting the D2C signal is maintained, while the power level for transmitting the D2D signal is adjusted (e.g., reduced). It should be noted that the first power level may be controlled according to a closed-loop power control mechanism, and the second power level may be controlled according to an open-loop power control mechanism. Thus, the communication device may transmit the signals completely, i.e., with sufficient power levels, and the receptions of the signals are not affected.

Realization of the present invention is not limited to the above description.

According to the process 50, the D2C signal may be transmitted in the subframe of at least one first carrier, and the D2D signal is transmitted in the subframe of a second carrier. In one example, the D2C signal and the D2D signal may be transmitted in the subframe of different carriers, i.e., the at least one first carrier does not include the second carrier. In one example, the D2C signal and the D2D signal may be transmitted in the subframe of the same carrier, i.e., the at least one first carrier may include the second carrier. When the D2C signal is transmitted in the subframe of a single carrier, the above examples reduce to simple cases where the two carriers for transmitting the D2C signal and the D2D signal may be the same or different. Content of the D2C signal is not limited herein. In one example, the second power level in the process 50 may be controlled according to a power level limit of the second carrier (e.g., maximum transmit power level). In another example, the second power level may be controlled according to the first power level of the D2C signal, the power level limit of the first communication device and the power level limit of the second carrier. The D2C signal may include UL control information. For example, the UL control information may include hybrid automatic repeat request (HARQ) feedback (s), channel status information and/or random access channel. That is, the priority of the D2C signal is higher than the priority of the D2D signal, because the D2C signal includes the UL information. In one example, the second power level in the process 50 may be adjusted to zero. That is, the D2D signal is not transmitted (e.g., is dropped).

Figure 6:
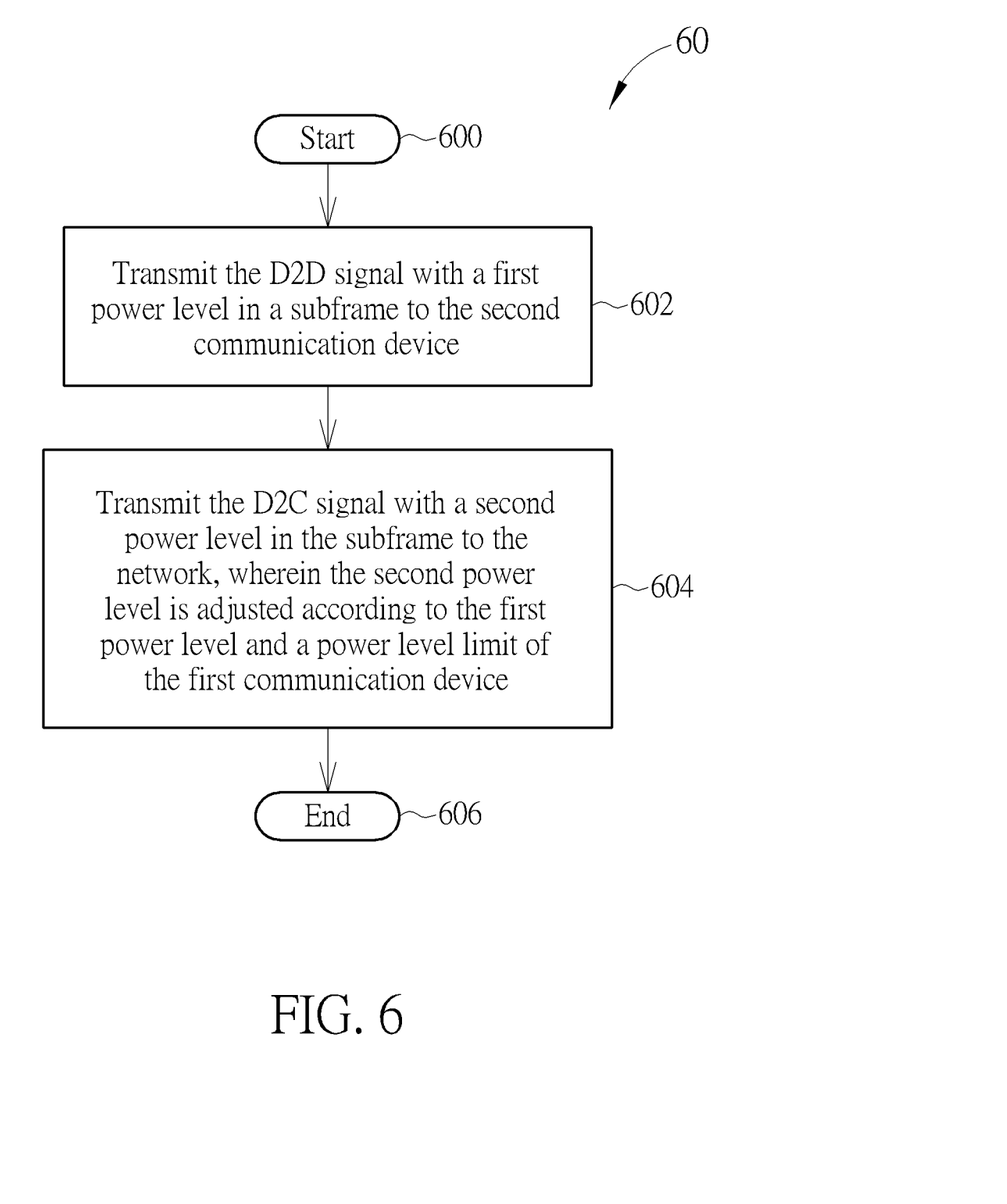
FIG. 6 is a flowchart of a process according to an example of the present invention.

FIG. 6 is a flowchart of a process 60 according to an example of the present invention. The process 60 may be utilized in a first communication device for handling (e.g., multiplexing) a D2D signal and a D2C signal, to communicate with a second communication device and the network. The process 60 may be compiled into the program code 214 and includes the following steps:

Step 600: Start.

Step 602: Transmit the D2D signal with a first power level in a subframe to the second communication device.

Step 604: Transmit the D2C signal with a second power level in the subframe to the network, wherein the second power level is adjusted according to the first power level and a power level limit of the first communication device.

Step 606: End.

According to the process 60, the first communication device transmits the D2D signal with a first power level in a subframe to the second communication device, and transmits the D2C signal with a second power level in the subframe to the network, wherein the second power level is adjusted according to the first power level and a power level limit of the first communication device (e.g., maximum transmit power level). That is, the first communication device may adjust (e.g., reduce) the second power level for transmitting the D2C signal, such that the total transmit power level used in the subframe is not greater than the power level limit (e.g., defined in a communication standard). In other words, a priority of the D2D signal may be higher than a priority of the D2C signal. Accordingly, the power level for transmitting the D2D signal is maintained, while the power level for transmitting the D2C signal is adjusted (e.g., reduced). It should be noted that the first power level may be controlled according to an open-loop power control mechanism, and the second power level may be controlled according to a closed-loop power control mechanism. In addition, a SRS in the D2C signal (or the D2C signal is simply the SRS) may be dropped to adjust the second power level according to the first power level and a power level limit of the first communication device. Thus, the communication device may transmit the signals completely, i.e., with sufficient power levels, and the receptions of the signals are not affected.

Realization of the present invention is not limited to the above description.

According to the process 60, the D2C signal may be transmitted in the subframe of at least one first carrier, and the D2D signal is transmitted in the subframe of a second carrier. In one example, the D2C signal and the D2D signal may be transmitted in the subframe of different carriers, i.e., the at least one first carrier does not include the second carrier. In one example, the D2C signal and the D2D signal may be transmitted in the subframe of the same carrier, i.e., the at least one first carrier may include the second carrier. When the D2C signal is transmitted in the subframe of a single carrier, the above examples reduce to simple cases where the two carriers for transmitting the D2C signal and the D2D signal may be the same or different. In one example, the second power level in the process 60 may be controlled according to at least one power level limit of the at least one first carrier (e.g., maximum transmit power level(s)). In another example, the second power level may be controlled according to the first power level of the D2D signal, the power level limit of the first communication device and the at least one power level limit of the at least one first carrier. In one example, the second power level in the process 60 may be adjusted to zero. That is, the D2C signal is not transmitted (e.g., is dropped).

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SIP), a computer on module (COM), and the communication device 20.

To sum up, the present invention provides a method of handling (e.g., multiplexing) a D2C signal and a D2D signal. The present invention solves that a communication device in the art does not know how to transmit the D2C signal and the D2D signal in the subframe. In addition, the total power level used by a communication device can be kept within a power level limit of the communication device, when the communication device transmits the D2D signal and the D2C signal in the same subframe.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a device-to-device (D2D) signal and a device-to-cellular (D2C) signal for a first communication device, the method comprising:
   communicating with a second communication device according to a D2D communication;
   communicating with a network according to a D2C communication; and
   transmitting one of the D2D signal and the D2C signal in a subframe, wherein the D2D signal and the D2C signal are transmitted to the second communication device and the network, respectively;
   wherein the D2D communication and the D2C communication are performed according to different timings.

2. The method of claim 1, wherein the subframe is a D2D subframe.

3. The method of claim 1, wherein the D2C signal comprises a sounding reference signal (SRS).

4. The method of claim 3, wherein the SRS is a cell-specific SRS.

5. The method of claim 3, wherein the SRS is a communication device-specific SRS.

6. The method of claim 5, wherein the communication device-specific SRS is a periodic SRS, or is an aperiodic SRS.

7. The method of claim 1, wherein the first communication device is in a coverage area of a first cell, and the second communication device is in a coverage area of a second cell.

8. The method of claim 1, wherein the D2D signal is transmitted in the subframe of a first carrier, and the D2C signal is transmitted in the subframe of a second carrier.

9. The method of claim 1, wherein the one of the D2D signal and the D2C signal is the D2C signal.

10. The method of claim 1, wherein the other one of the D2D signal and the D2C signal is dropped.

11. A method of handling a device-to-device (D2D) signal and a device-to-cellular (D2C) signal for a first communication device, the method comprising:
    transmitting the D2D signal in a subframe to a second communication device;
    transmitting the D2C signal in the subframe to a network, when the D2C signal comprises a communication device-specific sounding reference signal (SRS); and
    reserving resource in the subframe, when the D2C signal comprises a cell-specific SRS.

12. The method of claim 11, wherein the subframe is a D2D subframe.

13. The method of claim 11, wherein the communication device-specific SRS is a periodic SRS, or is an aperiodic SRS.

14. The method of claim 11, wherein the first communication device is in a coverage area of a first cell, and the second communication device is in a coverage area of a second cell.

15. The method of claim 14, wherein a SRS configuration of the first cell and a SRS configuration of the second cell are the same.

16. The method of claim 11, wherein the resource comprises a last single-carrier frequency-division multiple access (SC-FDMA) symbol of the D2D signal.

17. The method of claim 11, wherein the resource is reserved, when resources for transmitting the D2D signal and the D2C signal partly overlap.

18. The method of claim 11, wherein the D2D signal is transmitted in the subframe of a first carrier, and the D2C signal is transmitted in the subframe of a second carrier.

19. The method of claim 11, wherein the D2C signal is transmitted in a reserved resource of the subframe.

20. A method of handling a device-to-cellular (D2C) signal and a device-to-device (D2D) signal for a first communication device, the method comprising:
    communicating with a second communication device according to a D2D communication;

communicating with a network according to a D2C communication;

transmitting the D2C signal with a first power level in a subframe to the network; and transmitting the D2D signal with a second power level in the subframe to the second communication device, wherein the second power level is adjusted according to the first power level and a power level limit of the first communication device.

21. The method of claim 20, wherein the D2C signal is transmitted in the subframe of at least one first carrier, and the D2D signal is transmitted in the subframe of a second carrier.

22. The method of claim 20, wherein the D2C signal comprises uplink (UL) control information.

23. The method of claim 20, wherein the second power level is adjusted to zero.

24. A method of handling a device-to-cellular (D2C) signal and a device-to-device (D2D) signal for a first communication device, the method comprising:

transmitting the D2D signal with a first power level in a subframe to a second communication device; and transmitting the D2C signal with a second power level in the subframe to a network, wherein the second power level is adjusted according to the first power level and a power level limit of the first communication device.

25. The method of claim 24, wherein the D2C signal is transmitted in the subframe of at least one first carrier, and the D2D signal is transmitted in the subframe of a second carrier.

26. The method of claim 24, wherein a sounding reference signal (SRS) in the D2C signal is dropped to adjust the second power level according to the first power level and the power level limit of the first communication device.

27. The method of claim 24, wherein the second power level is adjusted to zero.

28. The method of claim 20, wherein the D2D communication and the D2C communication are performed according to different timings.

29. The method of claim 20, wherein a sum of the first power level and the second power level is greater than the power level limit, if the first communication device transmits the D2D signal and the D2C signal in the subframe and the second power level is not adjusted.

* * * * *